Feb. 4, 1969   M. WEBER   3,425,906
HEAT EXCHANGER OF A NUCLEAR REACTOR

Inventor:
MAX WEBER

United States Patent Office 3,425,906
Patented Feb. 4, 1969

3,425,906
HEAT EXCHANGER OF A NUCLEAR REACTOR
Max Weber, Wiesendangen, Zurich, Switzerland, assignor to Sulzer Brothers, Limited, Winterthur, Switzerland, a corporation of Switzerland
Filed Apr. 5, 1966, Ser. No. 540,231
Claims priority, application Switzerland, Apr. 7, 1965, 4,836/65
U.S. Cl. 176—65    10 Claims
Int. Cl. G21e 15/26, 19/28

ABSTRACT OF THE DISCLOSURE

The nuclear reactor includes a heat exchanger which is constructed with a grate formed with a plurality of apertures and upon which a plurality of heat exchange elements are mounted over the apertures. The grate is disposed within a duct of the heat exchanger so as to divide the duct into an upper and lower chamber. The heat exchange elements are disposed in the upper chamber to conduct a primary coolant into the lower chamber.

---

This invention relates to a heat exchanger. More particularly, this invention relates to a heat exchanger of a nuclear reactor. Still more particularly, this invention relates to a mounting for a heat exchanger of a nuclear reactor.

Generally, the heat exchanger of the invention is utilized in combination with a nuclear reactor in a nuclear reactor installation. The heat exchanger includes a duct connected to a nuclear reactor through which a primary coolant flows, a plurality of heat exchange elements which are arranged in parallel relationship adjacent one another within the duct, a grate which is composed of bars and arranged relative to the heat exchange elements so that the spaces between adjacent heat exchange elements and between the heat exchange elements and duct are defined at one end, at least partially by the bars of the grate, and a packing secured in slidable relation between the grate and duct approximately at the level of the grate so as to divide the duct into two chambers with the heat exchange elements in one chamber communicating with the other chamber through apertures in the grate.

Figure 1:
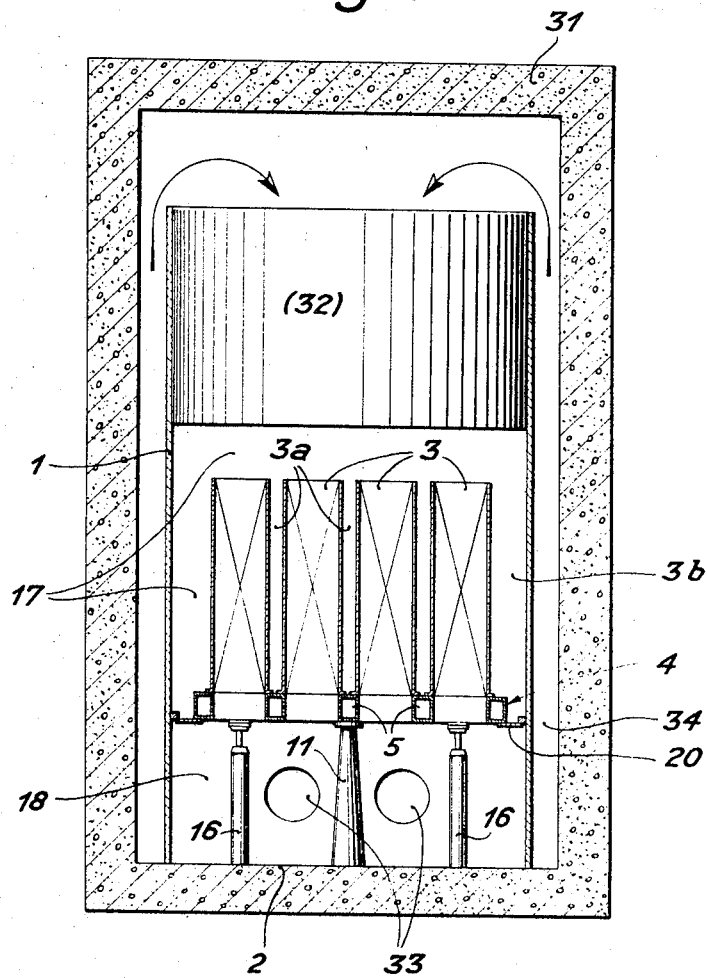
Figure 2:
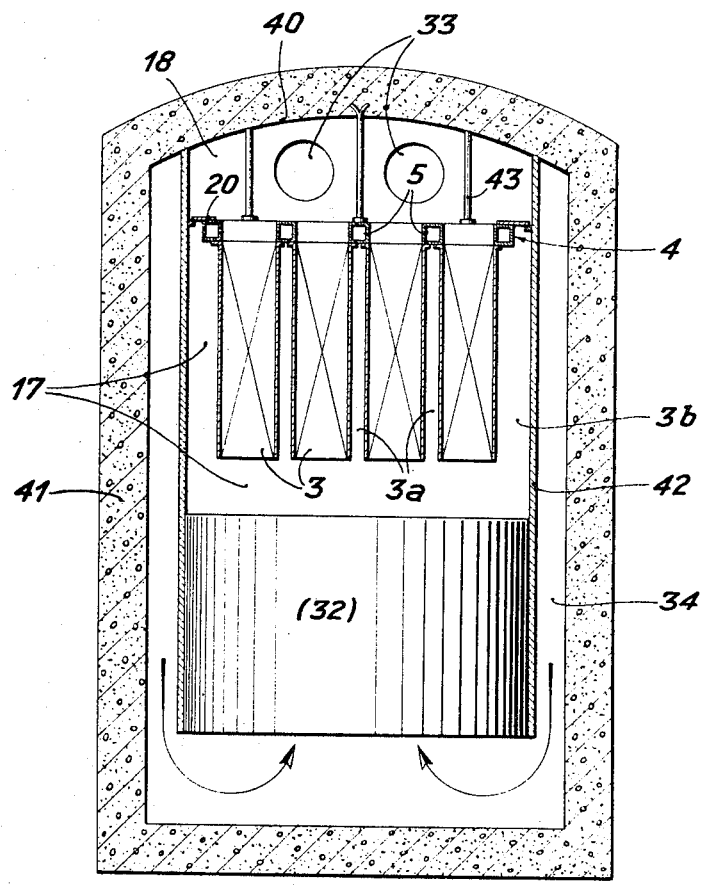
Figure 3:
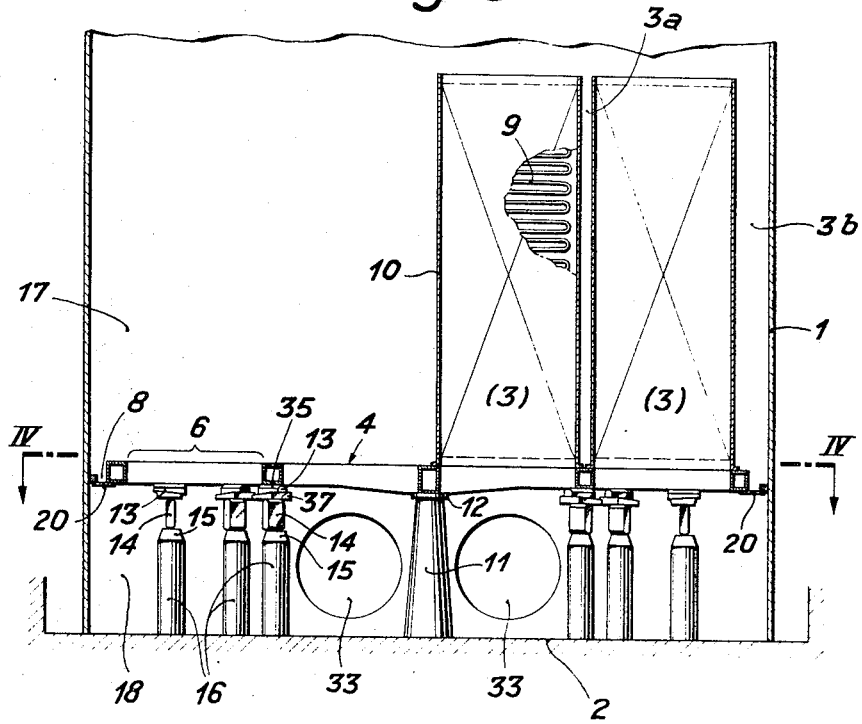
Figure 4:
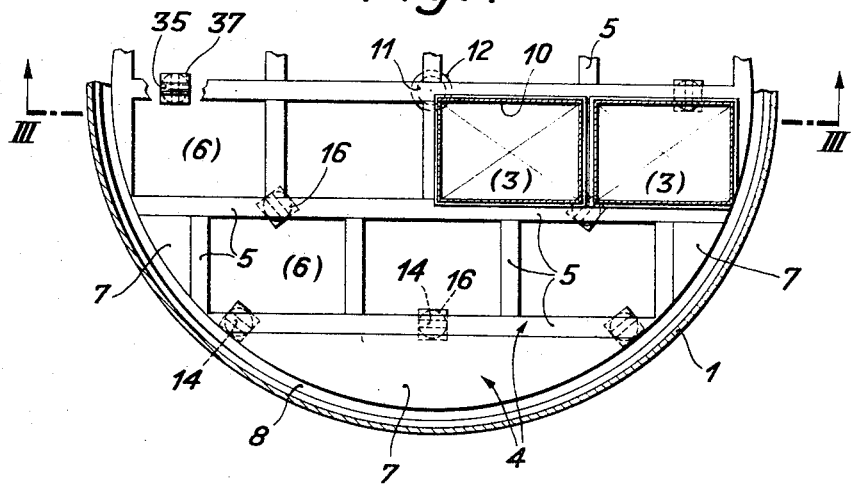
Figure 5:
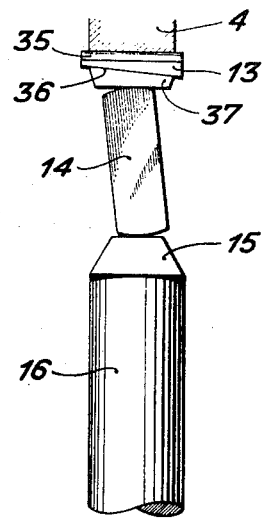
Figure 6:
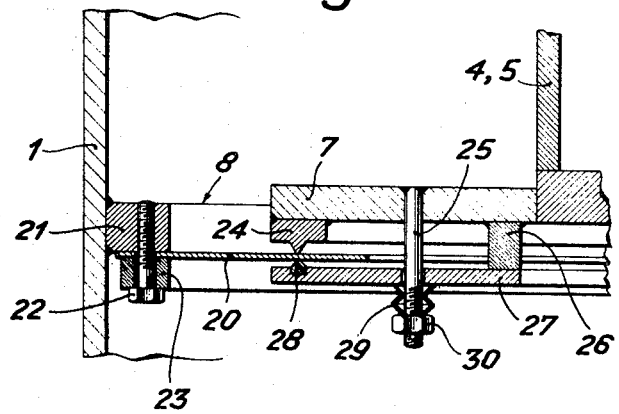

The objects and advantages of the invention will become more apparent from the following detailed description taken in conjunction with the accompanying drawings in which:

FIG. 1 is a section through a reactor installation with a heat exchanger constructed according to the invention;
FIG. 2 shows a reactor installation with a modified embodiment of the heat exchanger;
FIG. 3 is a vertical section on line III–III in FIG. 4;
FIG. 4 is a horizontal section on line IV–IV in FIG. 3;
FIG. 5 shows a detail of a movable grate support; and
FIG. 6 shows a packing provided between the duct and the grate.

Referring to FIG. 1, a reactor 32 is housed in a pressure-resistant housing 31 made, for example, of concrete and joined to a wall 1 of a duct ending at the bottom 2 of the housing 31. A plurality of heat exchange elements 3, constructed according to the invention, are arranged one beside the other on a grate 4 within the duct below the reactor 32. The grate is joined to the wall 1 by a movable packing 20 so that the duct is divided approximately at the level of the grate 4 into two chambers 17, 18.

A reactor coolant flows down through the reactor 32 and passes initially as a primary coolant into the chamber 17 which contains the heat exchange elements 3 and then into the chamber 18 below the grate 4. The coolant, now cooled, leaves the duct through outlet apertures 33 in the lower chamber 18 and passes through an annular gap 34 between the housing 31 and duct wall 1 back to the reactor 32 under the influence of suitable circulation blowers (not shown).

In the embodiment shown in FIG. 2, the reactor 32 is contained in a pressure-resistant housing 41 closed by a roof 40 and joined to a wall 42 of a duct secured to the roof 40 of the housing 41. The heat exchange elements 3 are suspended in the duct above the reactor on a grate 4 which is suitably attached by tension members 43 to the roof 40. A reactor coolant flows upwards through the reactor 32 and heat exchange elements 3.

Referring to FIGS. 3, 4 and 5, the heat exchange elements 3 are supported in the duct which is of circular cross-section on the grate 4. The grate consists of interconnected box-like bars 5 which surround apertures 6 and define spaces 3a between the elements 3. The bars 5 also cooperate with plates 7 to define spaces 3b between the elements 3 and wall 1, except for an annular gap 8. Each heat exchange element 3 includes lateral walls 10 which are secured to the grate 4 to form a box-like enclosure open at the top and bottom and a pipe string 9 within the lateral walls 10 through which a secondary coolant flows and around which the primary coolant flows. The enclosure formed by the walls 10 allows the heat exchange elements 3 in the chamber 17 to communicate through the apertures 6 with the chamber 18 below the grate 4.

The grate 4 is supported on the floor 2 by a rigid central support 11 having a circular cross-section situated in the longitudinal axis of the duct through a cover plate 12 which is rigidly connected thereto and by a plurality of supports 16 which are positioned in radial planes relative to the central support 11. The grate 4 is supported on the supports 16 through plates 13 having cylindrical bearing surfaces 35 with each plate 13 resting by way of a wedge surface 36 on an insert 37 which is movable on an end of a roller bearing block 14. The block 14 in turn rests on the opposite end of a cover plate 15 belonging to a cylindrical support 16. The parts 13, 37, 14 are directed by stops and toothing (not shown).

Referring to FIG. 6, the gap 8 and the grate edge formed by the bars 5 and plate 7 are covered by a substantially horizontal, circular or polygonal packing ring 20 which consists of several interconnected segments. The packing ring 20 is tightly attached to a ring 21 mounted on the duct wall 1 at or near the outer edge by a plurality of screws 22 and ring segments 23 with the inner edge of the packing ring projecting beyond a continuous annular profile packing 24 at the edge of the plate 7. In addition, the plate 7 is provided with a series of bolts 25 and cams 26 which are positioned concentrically within the packing 24 but which project axially out of the plane of the packing 24. Clamping plates 27 which are placed over the bolts 25 bear on the cams 26 and, by way of beads 28, on the packing ring 20 and are braced by a plurality of spring washers 29 and a locknut 30.

The grate 4 expands during operation of the apparatus because of the heat. Therefore, the roller bearing blocks 14 are set on the supports 16 so that the part of the grate 4 supported thereon can move radially outwards from the stationary support 11 in response to the thermal expansion. Also, since the gap 8 is sealed off by the packing ring 20 which is guided between the profiled packing 24 and the clamping plates 27, the grate 4 can move radially relative to the packing ring 20 and therefore relative to the wall 1 during thermal expansion. Further, if the packing ring 20 is made resilient, the packing can take up any slight displacement of the grate 4 relative to the wall 1 in the direction of the longitudinal axis of the duct due to the thermal expansion of the supports 11, 16.

The wedge surface 36 of the plate 13 may be used for example to compensate for assembly inaccuracies, while the cylindrical bearing surface 35 of the plate 13 provides a good mounting for the grate supported thereon.

The invention provides a very simple, compact and economical construction wherein the heat exchange elements 3 form relatively small, light units for transport and assembly.

The grate 4 provides a stable bearing surface for the heat exchange elements 3 arranged thereon so that the positions of the elements 3 relative to each other remain substantially unchanged in service with the distance 3a between the elements 3 being kept very small. Since each aperture at the bottom of an element 3 generally corresponds to an aperture 6 in the grate 4, these two apertures undergo substantially the same thermal expansion and can therefore easily be tightly joined.

A further advantage of the invention is that the chamber 18 below the grate 4 is easily accessible because of the small number of supports 11, 16. Assembly and repair work, for example on the elements 3 or grate 4, are therefore easier.

In other embodiments of the invention the movable bearing for the grate 4 may be designed so that the supports are hinged supports movable radially relative to the stationary support, also that the supports are flexible in the radial direction.

In still another embodiment of the invention, two packing rings 20 may be arranged between the duct wall 1 and the edge of the grate 4, to form a substantially annular chamber into which a sealing medium for example, a cooled heat-emitting coolant is fed at a pressure higher than that prevailing in the duct.

Having thus described the invention it is not intended that it be so limited as changes may be readily made therein without departing from the scope of the invention. Accordingly, it is intended that the foregoing detailed description and appended drawings be interpreted as illustrative only and not in a limiting sense.

What is claimed is:

1. In combination with a nuclear reactor installation having a nuclear reactor therein, a heat exchanger comprising a duct connected to the nuclear reactor for the passage of a primary coolant therethrough from the nuclear reactor, a grate having a plurality of bars therein forming a plurality of apertures therebetween, said grate being disposed intermediately within said duct in spaced relation thereto to divide said duct into an upper chamber and a lower chamber, a plurality of heat exchange elements disposed on said grate, each of said elements being supported on a number of said plurality of bars over a respective one of said apertures in said grate in spaced parallel relationship to the adjacent elements of said heat exchange elements for passage of the primary coolant therethrough into said lower chamber, a packing means disposed between said grate and said duct for sealing said lower chamber from said upper chamber, and passage means in said duct adjacent said lower chamber for recirculation of the primary coolant to the nuclear reactor.

2. The combination as set forth in claim 1, wherein each of said heat exchange elements includes a plurality of lateral walls forming an enclosure open at top and bottom and a pipe string within said walls to convey a second coolant flow therethrough whereby the primary coolant flows over said pipe string into said lower chamber.

3. The combination as set forth in claim 2 wherein said enclosure is rectangular and is secured to the respective bars of said grate.

4. The combination as set forth in claim 1 wherein said packing means is fixedly secured to one of said duct and grate and slidably secured to the other of said duct and grate whereby said grate is radially movable with respect to said duct upon thermal expansion thereof.

5. The combination as set forth in claim 4 wherein said packing means includes a pair of horizontal vertically spaced packing rings forming an annular chamber therebetween, and a sealing medium disposed in said annular chamber.

6. The combination as set forth in claim 1 which further comprises a support means for said grate disposed in said duct.

7. The combination as set forth in claim 6 wherein said support means includes a stationary support disposed on the longitudinal axis of said grate and a plurality of movable supports disposed in radial planes with respect to said stationary support.

8. The combination as set forth in claim 7 wherein each of said movable supports is a hinge-like support movable radially with respect to said stationary support.

9. The combination as set forth in claim 7 wherein each of said movable supports is flexible in a direction radial to said stationary support.

10. The combination as set forth in claim 7 wherein each of said movable supports includes a roller bearing block disposed for movement in a radial plane relative to said stationary support.

No references cited.

REUBEN EPSTEIN, *Primary Examiner.*

U.S. Cl. X.R.

165—47, 68